(12) United States Patent
Soryal

(10) Patent No.: US 11,983,925 B2
(45) Date of Patent: May 14, 2024

(54) DETECTING SYNTHETIC MEDIA

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 605 days.

(21) Appl. No.: 17/176,111

(22) Filed: Feb. 15, 2021

(65) Prior Publication Data
US 2022/0261580 A1 Aug. 18, 2022

(51) Int. Cl.
*G06V 20/00* (2022.01)
*G06F 21/10* (2013.01)
*G06N 20/00* (2019.01)
*G06V 20/40* (2022.01)
*G06V 40/16* (2022.01)

(52) U.S. Cl.
CPC .............. *G06V 20/46* (2022.01); *G06F 21/10* (2013.01); *G06N 20/00* (2019.01); *G06V 20/41* (2022.01); *G06V 40/176* (2022.01)

(58) Field of Classification Search
CPC ...................................................... G06V 20/46
See application file for complete search history.

(56) References Cited

U.S. PATENT DOCUMENTS

| 10,810,725 | B1* | 10/2020 | Dolhansky | G06V 10/764 |
| 11,695,975 | B1* | 7/2023 | Giraud | G06V 40/40 |
| | | | | 725/25 |
| 2021/0042529 | A1* | 2/2021 | Price | G06V 20/41 |
| 2021/0233204 | A1* | 7/2021 | Alattar | G06F 18/22 |
| 2021/0406568 | A1* | 12/2021 | Liberman | G06V 10/82 |
| 2022/0121868 | A1* | 4/2022 | Chen | G06F 18/22 |
| 2022/0138472 | A1* | 5/2022 | Mittal | G06N 3/045 |
| | | | | 382/181 |
| 2023/0053277 | A1* | 2/2023 | Yocam | G06F 16/436 |

* cited by examiner

Primary Examiner — Oneal R Mistry

(57) ABSTRACT

An example method includes calculating a plurality of scores for a test media clip using a plurality of authenticity algorithms, where the test media clip depicts a person, and wherein each authenticity algorithm of the plurality of authenticity algorithms generates a respective score of the plurality of scores which indicates a likelihood that the test media clip is authentic, testing each authenticity algorithm of the plurality of authenticity algorithms against a plurality of historical media clips, in order to determine, for the each authenticity algorithm, a reliability of the each algorithm in terms of being able to estimate authenticity, deriving a plurality of weights based on the testing, wherein each weight of the plurality of weights is associated with one algorithm of the plurality of authenticity algorithms, and computing a cumulative authenticity score for the test media clip, by aggregating the plurality of scores weighted by the plurality of weights.

20 Claims, 7 Drawing Sheets

DETECTING SYNTHETIC MEDIA

The present disclosure relates generally to wireless devices, and relates more particularly to devices, non-transitory computer-readable media, and methods for detecting synthetic media.

BACKGROUND

Synthetic media, also known "deepfakes," are media which leverage techniques from machine learning and artificial intelligence in order to manipulate or generate visual and audio content in a highly realistic manner, and often with an intent to deceive those watching or listening to the media. For instance, a deepfake video may manipulate the likeness and/or voice of a well-known individual, such as a politician, an actor, a professional athlete, or the like, to make it appear as if that individual is doing or saying something that he or she did not or would not do or say. Deepfakes are not limited to depicting well-known individuals, however.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
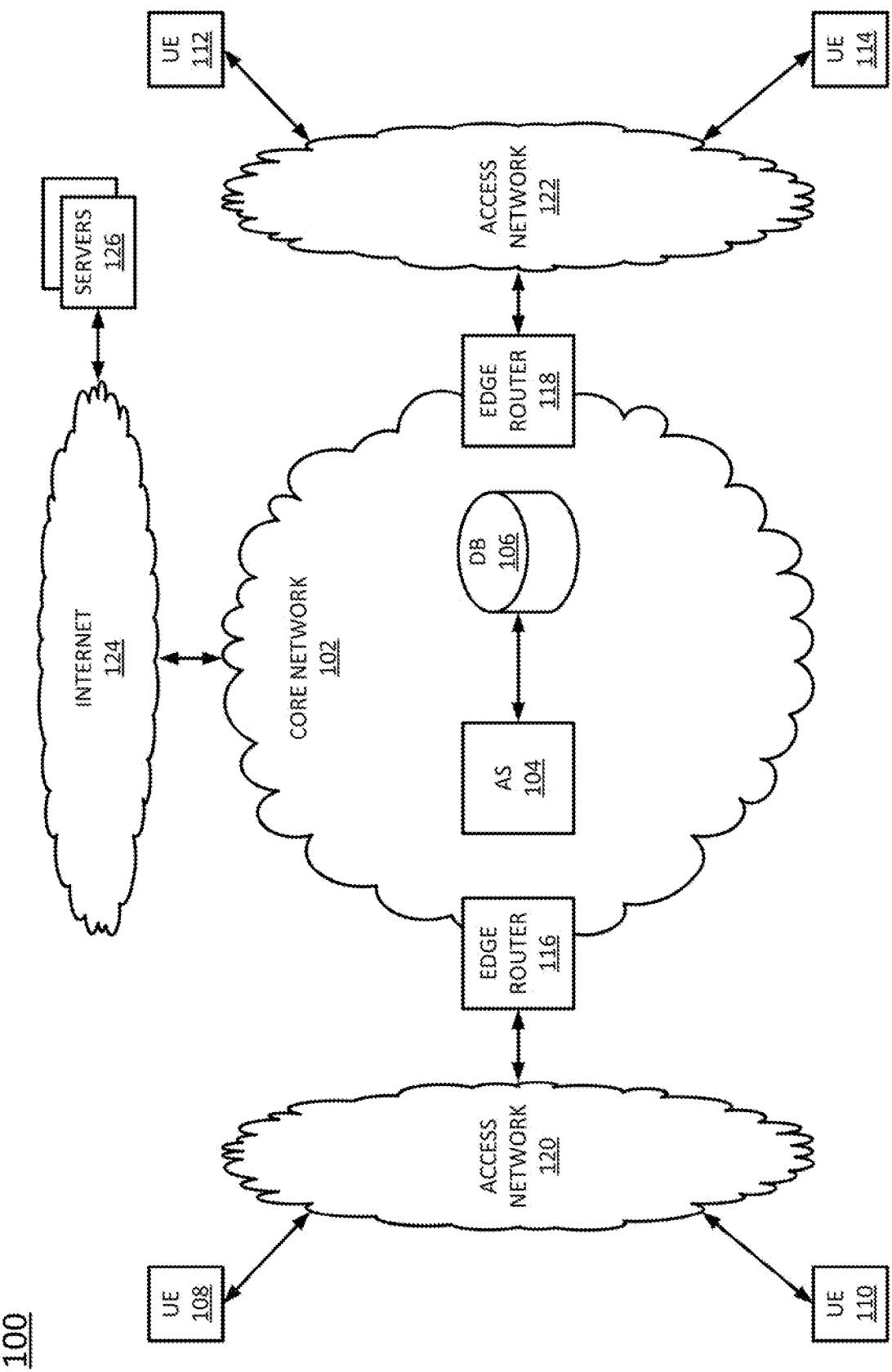
FIG. 1 illustrates an example system in which examples of the present disclosure for detecting synthetic media may operate.

The present disclosure broadly discloses methods, computer-readable media, and systems for detecting synthetic media. In one example, a method performed by a processing system includes calculating a plurality of scores for a test media clip using a plurality of authenticity algorithms, where the test media clip depicts a person, and wherein each authenticity algorithm of the plurality of authenticity algorithms generates a respective score of the plurality of scores which indicates a likelihood that the test media clip is authentic, testing each authenticity algorithm of the plurality of authenticity algorithms against a plurality of historical media clips, in order to determine, for the each authenticity algorithm, a reliability of the each authenticity algorithm in terms of being able to estimate authenticity, deriving a plurality of weights based on the testing, wherein each weight of the plurality of weights is associated with one authenticity algorithm of the plurality of authenticity algorithms, and computing a cumulative authenticity score for the test media clip, by aggregating the plurality of scores weighted by the plurality of weights.

In another example, a non-transitory computer-readable medium may store instructions which, when executed by a processing system in a communications network, cause the processing system to perform operations. The operations may include calculating a plurality of scores for a test media clip using a plurality of authenticity algorithms, where the test media clip depicts a person, and wherein each authenticity algorithm of the plurality of authenticity algorithms generates a respective score of the plurality of scores which indicates a likelihood that the test media clip is authentic, testing each authenticity algorithm of the plurality of authenticity algorithms against a plurality of historical media clips, in order to determine, for the each authenticity algorithm, a reliability of the each authenticity algorithm in terms of being able to estimate authenticity, deriving a plurality of weights based on the testing, wherein each weight of the plurality of weights is associated with one authenticity algorithm of the plurality of authenticity algorithms, and computing a cumulative authenticity score for the test media clip, by aggregating the plurality of scores weighted by the plurality of weights.

In another example, a device may include a processing system including at least one processor and non-transitory computer-readable medium storing instructions which, when executed by the processing system when deployed in a communications network, cause the processing system to perform operations. The operations may include calculating a plurality of scores for a test media clip using a plurality of authenticity algorithms, where the test media clip depicts a person, and wherein each authenticity algorithm of the plurality of authenticity algorithms generates a respective score of the plurality of scores which indicates a likelihood that the test media clip is authentic, testing each authenticity algorithm of the plurality of authenticity algorithms against a plurality of historical media clips, in order to determine, for the each authenticity algorithm, a reliability of the each authenticity algorithm in terms of being able to estimate authenticity, deriving a plurality of weights based on the testing, wherein each weight of the plurality of weights is associated with one authenticity algorithm of the plurality of authenticity algorithms, and computing a cumulative authenticity score for the test media clip, by aggregating the plurality of scores weighted by the plurality of weights.

As discussed above, synthetic media, also known "deepfakes," are media which leverage techniques from machine learning and artificial intelligence in order to manipulate or generate visual and audio content in a highly realistic manner, and often with an intent to deceive those watching or listening to the media. The ability to manipulate visual and audio content in a realistic and convincing manner has led to concerns that such technology could be misused for blackmail, propagation of false news stories, social engineering, and other non-consensual uses of individuals' likenesses. For instance, to the average person, a deepfake video may be virtually indistinguishable from a genuine video. As artificial intelligence and machine learning techniques continue to advance, it will become even harder to distinguish synthetic media from non-synthetic media.

Examples of the present disclosure provide techniques for detecting synthetic media. In some examples, these techniques may analyze newly obtained items of media in order to estimate the authenticity of the items of media. For instance, various characteristics of a media being analyzed may be extracted and compared to characteristics of historical instances of similar media (e.g., media depicting similar events and/or individuals). The analysis may produce a score that is indicative of a confidence in the authenticity of the media. The score may be associated with the media (e.g., by annotation, metadata, or the like), such that individuals who view or listen to the media may have some indication as to how likely the media is to be genuine. These and other aspects of the present disclosure are discussed in greater detail below in connection with the examples of FIGS. 1-7.

To further aid in understanding the present disclosure, FIG. 1 illustrates an example system 100 in which examples of the present disclosure for detecting synthetic media may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 116-118. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3$^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a gaming console, a set top box, a laptop computer, a tablet computer, a desktop computer, an Internet of Things (IoT) device, a wearable smart device (e.g., a smart watch, a fitness tracker, a head mounted display, or Internet-connected glasses), an application server, a bank or cluster of such devices, and the like. To this end, the user endpoint devices 108, 110, 112, and 114 may comprise one or more physical devices, e.g., one or more computing systems or servers, such as computing system 700 depicted in FIG. 7, and may be configured as described below.

In one example, one or more servers 126 may be accessible to user endpoint devices 108, 110, 112, and 114 via the Internet 124 in general. The server(s) 126 may operate in a manner similar to the AS 104, which is described in further detail below.

In accordance with the present disclosure, the AS 104 and DB 106 may be configured to provide one or more operations or functions in connection with examples of the present disclosure for estimating the authenticity of a media clip, as described herein. For instance, the AS 104 may be configured to operate as a Web portal or interface via which a user may request evaluation of a media clip whose authenticity is in question (e.g., a test media clip). A user endpoint device, such as any of the UEs 108, 110, 112, and/or 114 (e.g., wireless devices), may access a service on the AS 104 that evaluates the authenticity of a media clip.

Figure 7:
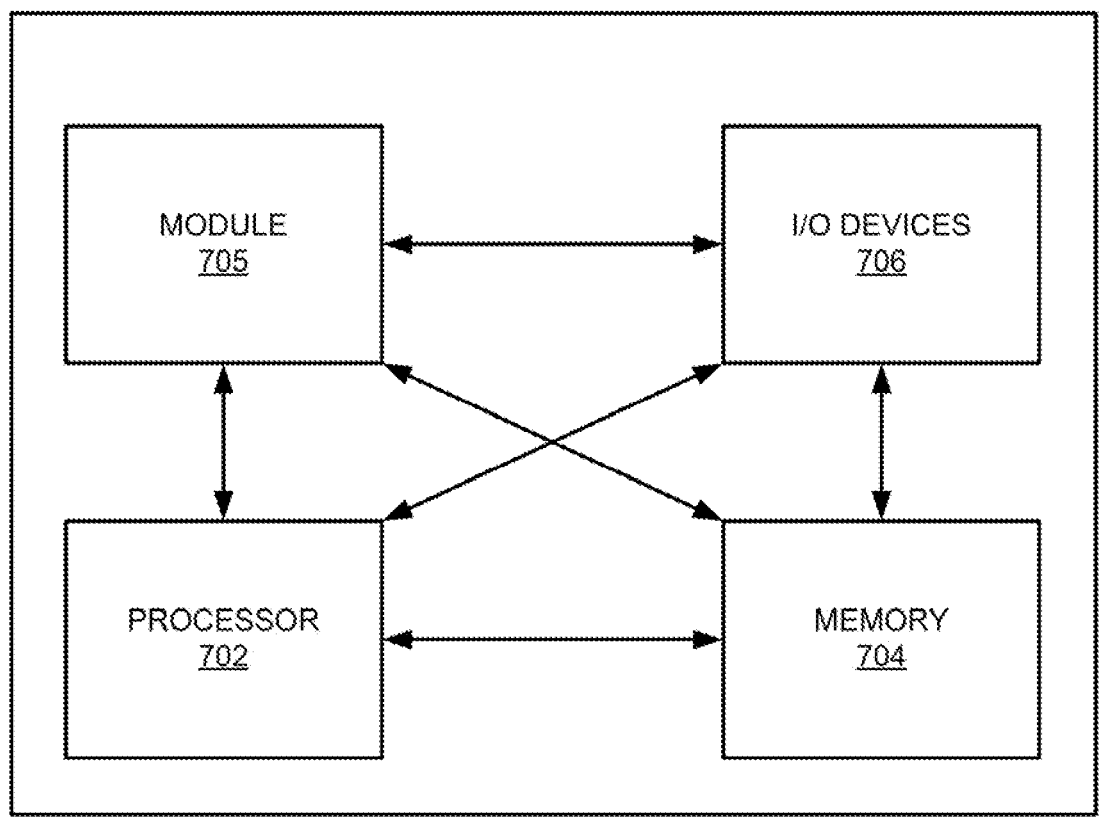
FIG. 7 depicts a high-level block diagram of a computing device or processing system specifically programmed to perform the functions described herein.

To this end, the AS 104 may comprise one or more physical devices, e.g., one or more computing systems or servers, such as computing system 700 depicted in FIG. 7, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 7 and discussed below) or multiple computing devices collectively configured to perform various steps, functions, and/or operations in accordance with the present disclosure.

For instance, in one example, the AS 104 (e.g., a remote hardware device or server) may obtain, from one of the user endpoint devices 108, 110, 112, or 114, a test media clip whose authenticity is in question. For instance, the test media clip may comprise a video that has been uploaded to a social media platform or a news web site. In one example, the AS 104 may, based on evaluation of the test media clip using a plurality of different authenticity algorithms, estimate a confidence score for the test media clip. The confidence score may indicate a likelihood that the test media clip is authentic. The different authenticity algorithms may evaluate different aspects of the test media clip, which may be compared to aspects of historical media clips using one or more machine learnings techniques, in order to identify markers that tend to indicate authenticity (or inauthenticity). In one example, the confidence score is an aggregation of different authenticity scores generated by the different authenticity algorithms. In a further example, the different authenticity scores may be weighted in the aggregation according to how well the corresponding authenticity algorithm was able to determine the authenticity of one or more historical media clips.

In one embodiment, the generation of the confidence score for a test media clip is performed with the full consent of the creator or submitter of the test media clip and/or with the full consent of the platform(s) from which the test media clip is uploaded and stored. In other words, the creator or submitter of the test media clip is allowing the test media clip to be analyzed and a confidence score to be generated and associated with the test media clip so that consumers of the test media clip would have a confidence that the test media clip is genuine. Alternatively or in addition, a social media platform may have a policy in which creators or submitters of test media clips are explicitly authorizing the social media platform to analyze, generate and associate a confidence score for each uploaded test media clip. Thus, in one embodiment, consent is provided to the entity who is tasked with analyzing, generating and associating the confidence score to each test media clip.

The AS 104 may have access to at least one database (DB) 106, where the DB 106 may store information related to a plurality of media clips and/or people depicted in a plurality of media clips. For instance, the DB 106 may store a plurality of historical media clips culled from various sources, such as social media, news web sites, and other online, electronic sources. The DB 106 may store along with each historical media clip, a profile for the historical media clip which identifies different characteristics of the historical media clip. The characteristic may include, for example, the person or people depicted in the historical media clip, the message of the historical media clip, the context of the historical media clip (e.g., circumstances, timing, and/or location), any outliers occurring in the historical media clip (e.g., behaviors that are considered outside of the mainstream for the average population), and other characteristics. In one example, the profile may be stored as metadata associated with the historical media clip or may be stored as a data structure that is separate from, but indexed to, the historical media clip.

In another example, the DB 106 may store profiles for various people who are depicted in the historical media clips. The profile for a person may identify various characteristics for the person, such as their opinions on particular topics, their occupation, and any consistent behavioral characteristics (e.g., a tendency to swear a lot or to make unsubstantiated claims). Thus, the profile for the person may establish a reliable baseline of that person's behaviors.

In one example, DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for detecting synthetic media, as described herein. Example methods for detecting synthetic media are described in greater detail below in connection with FIGS. 2-6.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
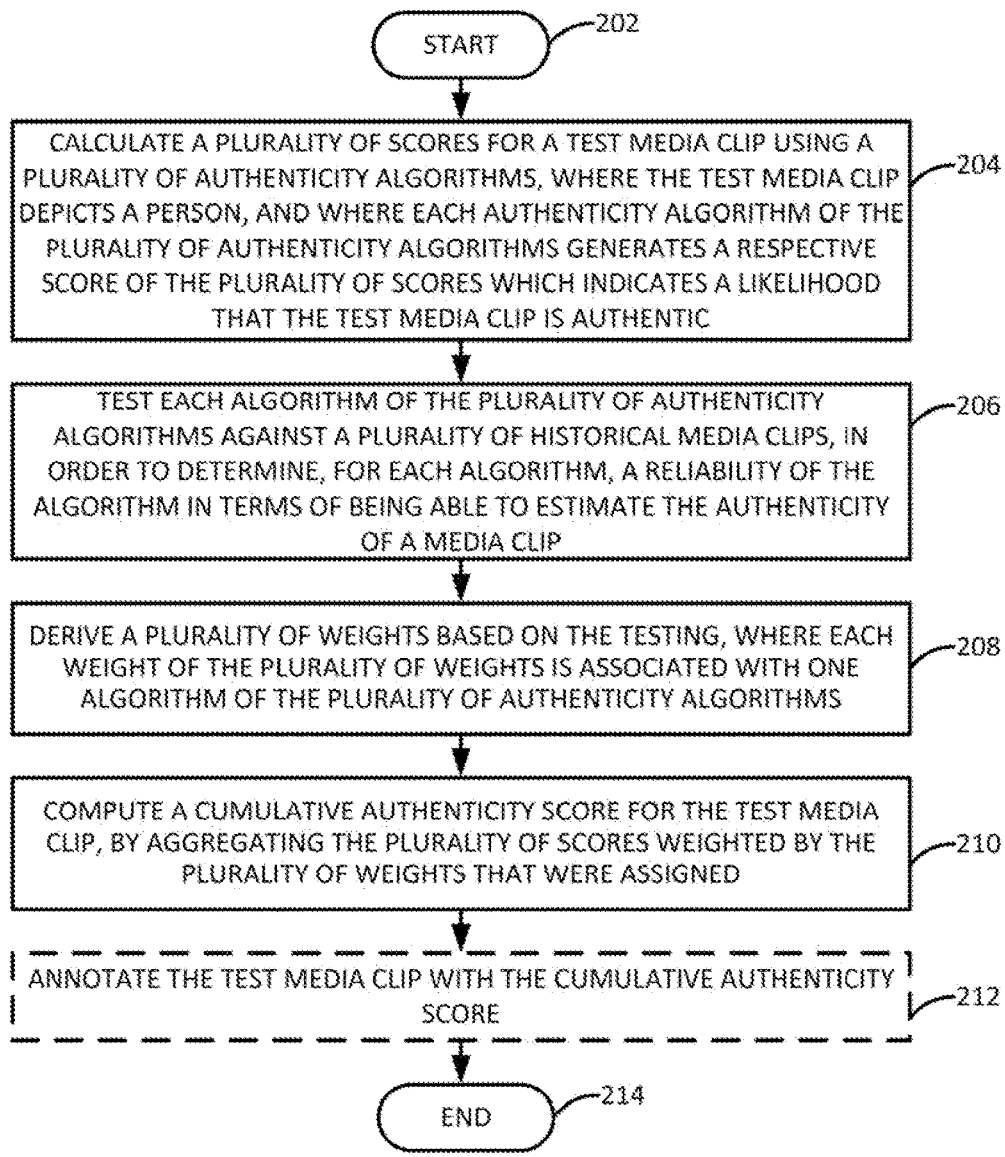
FIG. 2 illustrates a flowchart of an example method for estimating the authenticity of a media clip, in accordance with the present disclosure.

FIG. 2 illustrates a flowchart of an example method 200 for estimating the authenticity of a media clip, in accordance with the present disclosure. In one example, steps, functions and/or operations of the method 200 may be performed by a device as illustrated in FIG. 1, e.g., AS 104 or any one or more components thereof. In one example, the steps, functions, or operations of method 200 may be performed by a computing device or system 700, and/or a processing system 702 as described in connection with FIG. 7 below. For instance, the computing device 700 may represent at least a portion of the AS 104 in accordance with the present disclosure. For illustrative purposes, the method 200 is described in greater detail below in connection with an example performed by a processing system, such as processing system 702.

The method 200 begins in step 202 and proceeds to step 204. In step 204, the processing system may calculate a plurality of scores for a test media clip using a plurality of authenticity algorithms, where the test media clip depicts a person, and where each authenticity algorithm of the plurality of authenticity algorithms generates a respective score of the plurality of scores which indicates a likelihood that the test media clip is authentic (e.g., not a synthetic media clip). In one example, the test media clip may contain video, audio, or video and audio of the depicted person. The person depicted in the test media clip may be a well-known public figure, such as a politician, an actor, a professional athlete, or the like.

In one example, each authenticity algorithm of the plurality of authenticity algorithms may extract and examine different characteristics of the test media clip which may provide evidence as to the authenticity (or inauthenticity) of the test media clip. For instance, in one example, the plurality of authenticity algorithms may include at least one of: an algorithm that analyzes a message of the test media clip (e.g., an overall sentiment or opinion expressed by the person), an algorithm that compares the behavior of the person in the test media clip to the behavior of the person in at least one historical media clip (i.e., a media clip other than the test media clip), an algorithm that compares a context (e.g., location, timing, circumstances) of the test media clip with the context of at least one historical media clip, and an algorithm that statistically compares an attitude expressed by the person in the test media clip to an attitude expressed by the person in a plurality of historical media clips covering a period of time. FIGS. 3-6 describe each of these example algorithms in more detail. However, it will be appreciated that any of the algorithms discussed in FIGS. 3-6 may be excluded from the method 200. Moreover, other algorithms not described in FIGS. 3-6 could also be utilized in connection with step 204 of the method 200.

In step 206, the processing system may test each authenticity algorithm of the plurality of authenticity algorithms against a plurality of historical media clips, in order to determine, for each algorithm, a reliability of the algorithm in terms of being able to estimate the authenticity of a media clip. In one example, the authenticity (or inauthenticity) of the historical media clips may be known prior to performance of step 206.

For instance, the plurality of historical media clips may comprise x media clips, where each media clip of the x media clips has been independently confirmed to be either authentic (e.g., actually provided by the subject person, e.g., a politician, an actor, or a professional athlete, or affirmatively authenticated by such subject person, and so on) or not authentic (e.g., synthetically generated) prior to performance of the method 200. A given algorithm of the plurality of algorithms may be used to analyze each media clip of the x media clips. If the given algorithm correctly estimates the authenticity of y media clips (where y∈ {0, ..., x}), then the reliability of the given algorithm may be quantified as y/x. This process may be repeated for all of the algorithms in the plurality of authenticity algorithms utilized in step 204.

In step 208, the processing system may derive a plurality of weights based on the testing performed in step 206, where each weight of the plurality of weights is associated with one authenticity algorithm of the plurality of authenticity algorithms. In one example, the weight associated with a given authenticity algorithm may be equal to the reliability of the algorithm (e.g., y/x). In another example, the plurality of authenticity algorithms may be ranked according to reliability (e.g., most reliable to least reliable, or least reliable to most reliable), and each algorithm may then be assigned a weight that corresponds to its rank (e.g., the most reliable algorithm is assigned a weight of five, while the least reliable algorithm is assigned a weight of one, and the other algorithms are assigned weights between one and five).

In step 210, the processing system may compute a cumulative authenticity score for the test media clip, by aggregating the plurality of scores weighted by the plurality of weights that were assigned in step 208. For instance, the cumulative authenticity score may be calculated as:

$$\frac{\sum_{i=1}^{n} A_i w_i}{n} \quad \text{(EQN. 1)}$$

where n is the number of authenticity algorithms in the plurality of authenticity algorithms, $A_i$ is the score of the plurality of scores that was calculated using the $i^{th}$ algorithm of the plurality of authenticity algorithms (e.g., in step 204), and $w_i$ is the weight that was assigned to the $i^{th}$ algorithm (e.g., in step 208).

In optional step 212 (illustrated in phantom), the processing system may annotate the test media clip with the cumulative authenticity score. For instance, the processing system may generate a metadata tag, where the metadata tag indicates the value of the cumulative authenticity score. Alternatively, a threshold value may be established, where a cumulative authenticity score that falls below the threshold value may indicate that an associated media clip is unlikely to be authentic (e.g., is likely to be synthetic), and a cumulative authenticity score that is at least equal to the threshold value may indicate that an associated media clip is likely to be authentic (e.g., is unlikely to be synthetic). Thus, rather than indicate the value of the cumulative authenticity score, the metadata tag may instead indicate whether the test media clip is "likely authentic" or "unlikely authentic" based on an evaluation of the cumulative media score against the threshold value. Thus, in one embodiment, any user who subsequently plays the test media clip may be provided with an indication as to the likely authenticity of the test media clip. The method 200 may end in step 214.

Figure 3:
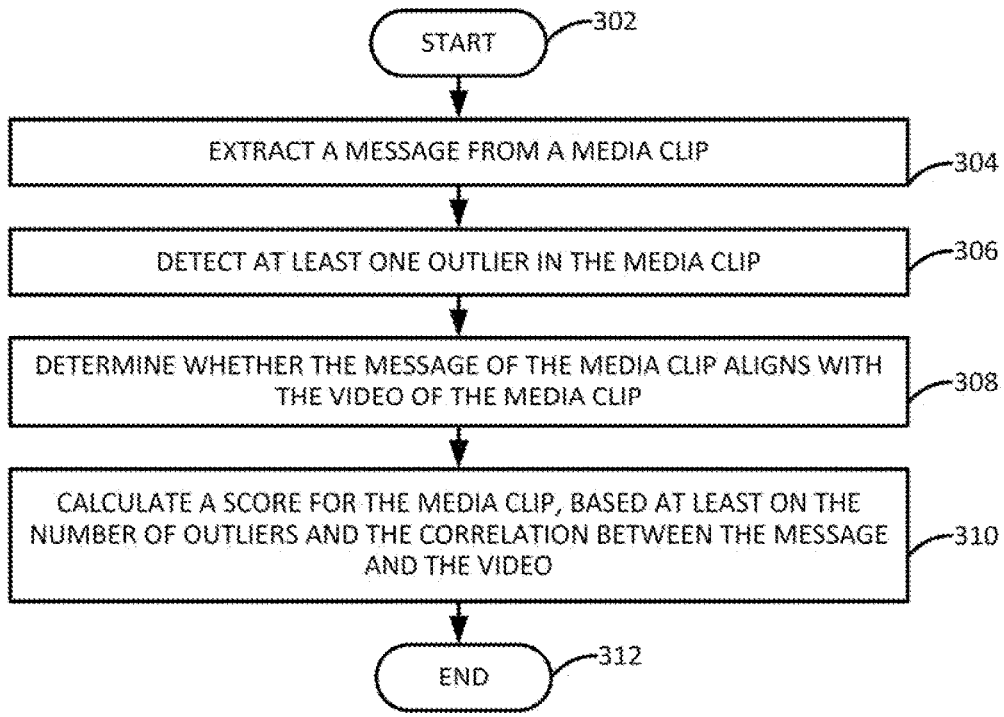
FIG. 3 illustrates a flowchart of an example method for calculating a confidence score for a test media clip, in accordance with the present disclosure.

FIG. 3 illustrates a flowchart of an example method 300 for calculating a confidence score for a test media clip, in accordance with the present disclosure. For instance, the method 300 may be implemented in conjunction with step 204 of the method 200, described above, as one of the plurality of authenticity algorithms. As such, in one example, steps, functions and/or operations of the method 300 may be performed by a device as illustrated in FIG. 1, e.g., AS 104 or any one or more components thereof. In one example, the steps, functions, or operations of method 300 may be performed by a computing device or system 700, and/or a processing system 702 as described in connection with FIG. 7 below. For instance, the computing device 700 may represent at least a portion of the AS 104 in accordance with the present disclosure. For illustrative purposes, the method 300 is described in greater detail below in connection with an example performed by a processing system, such as processing system 702. Generally, the method 300 may determine whether there is a coherence among the elements of a media clip such that the sum total of those elements tends to indicate authenticity or inauthenticity.

The method 300 begins in step 302 and proceeds to step 304. In step 304, the processing system may extract a message from a media clip. The media clip may be a test media clip (e.g., as discussed above in connection with step 204 of the method 200) or an historical media clip (e.g., as discussed above in connection with step 206 of the method 200). The message may comprise a prevailing thought or sentiment that is expressed in the test media clip (e.g., a political or financial belief, an opinion about a specific event or news item, or the like). Thus, in one example, techniques such as automatic speech recognition, sentiment analysis, and the like may be applied to the audio of the media clip to extract and consolidate the message down to, for instance, a single sentence, phrase, or thought (e.g., "Vote for Candidate X for political position Y"). In further examples, the message may also be extracted from an analysis of the video of the media clip. For instance, facial recognition, object recognition, text recognition, and other image analysis techniques may be used to extract information from which sentiment can be gleaned. As an example, a political campaign commercial may include images of a campaign poster or banner urging voters to vote for a particular candidate or reminding voters of the date of an upcoming election.

In step 306, the processing system may detect at least one outlier in the media clip. In one example, an outlier is understood, within the context of the present disclosure, to comprise a statement or action that is considered atypical or out of the mainstream for the general population. For instance, an outlier in this context might comprise excessive swearing, statements expressing unpatriotic sentiments, statements predicting extreme events (e.g., catastrophic financial market movements), statements encouraging illegal or unethical behavior (e.g., organizing unlawful events), or statements making implausible claims (e.g., an unidentified flying object (UFO) sighting). In one example, an outlier may be detected by using artificial intelligence techniques to compare a statement made in the media clip to one or more third party (e.g., online) resources, where the one or more third party resources may contradict the statement. For example, a statement encouraging unlawful gathering may be compared against one or more legal, religious, and/or civic resources that indicate that such unlawful gathering is illegal and/or immoral (and thus should not be encouraged). Thus, a fact-checking process could be used to verify at least some types of outliers. Other types of outliers may be pre-defined in a list that may not require comparison to a third-party source. For instance, if a statement or action occurring in the test media clip appears on the list, the statement or action may be identified as an outlier (e.g., swearing more than a threshold number of times, or using certain words even once, may qualify as an outlier). Any outliers that are detected in step 306 may be flagged in some manner (e.g., tagged with metadata or collected in a data structure such as a list or profile for the media clip) to indicate their status as outliers.

In step 308, the processing system may determine whether the message of the media clip aligns with the video of the media clip. In other words, the processing system may examine the media clip for a "disconnect" between the message and the images shown in the video. Artificial intelligence techniques may be used to determine whether the combination of message and video is consistent with the combination of message and video in historical media clips that have been verified to be authentic. For instance, if the message is religious in nature, then the video may be expected to depict a preacher addressing the camera from a pulpit or from another somber setting. A religious message would not be expected to be delivered by a preacher who is depicted relaxing in a swimming pool or attending a dance club.

In step 310, the processing system may calculate a score (e.g., a first score) for the media clip, based at least on the number of outliers (as detected in step 306) and the correlation between the message and the video (as evaluated in step 308). For instance, an initial score may be assigned to the media clip based on how strongly the message correlated with the video. The initial score may be proportional to a number of historical media clips that exhibited a similar correlation between message and video. As an example, if one to five historical media clips exhibit a similar correlation between message and video, the media clip may be assigned a first score (e.g., thirty-three); if five to ten historical media clips exhibit a similar correlation between message and video, the media clip may be assigned a second score (e.g., sixty-six) that is higher than the first score; if more than ten historical media clips exhibit a similar correlation between message and video, the media clip may be assigned a third score (e.g., ninety-nine) that is higher than the second score. These numbers are provided only as examples and do not limit the values of the scores and ranges of historical media clips, or the number of scores and ranges that may be implemented. In one example, for each outlier (or each x outliers) that is detected, a certain number of points may be subtracted from the initial score to generate the score. The method 300 may end in step 312.

Figure 4:
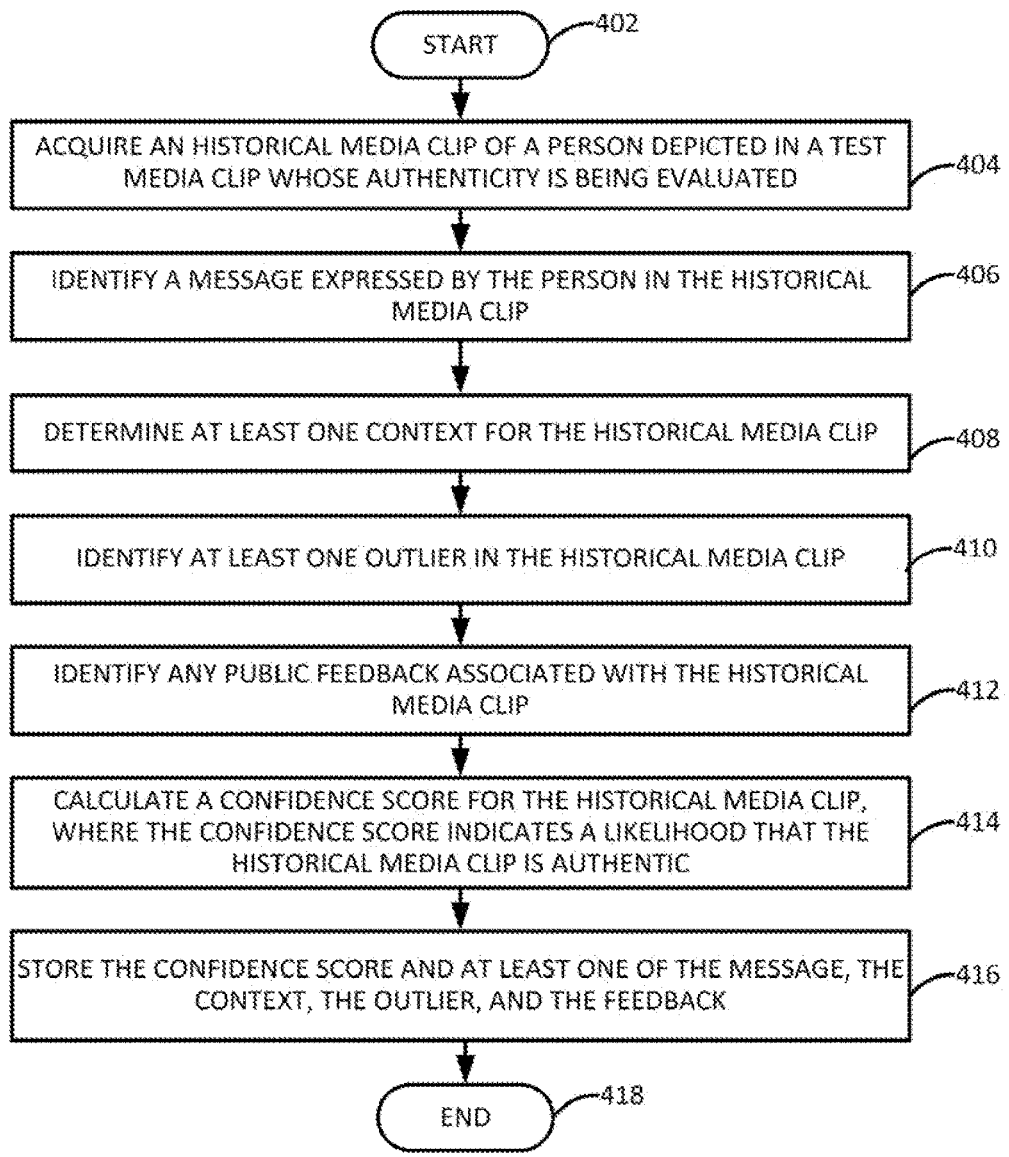
FIG. 4 illustrates a flowchart of an example method for calculating a confidence score for an historical media clip, in accordance with the present disclosure.

FIG. 4 illustrates a flowchart of an example method 400 for calculating a confidence score for an historical media clip, in accordance with the present disclosure. For instance, the method 400 may be implemented in conjunction with step 204 of the method 200, described above, as one of the plurality of authenticity algorithms. As such, in one example, steps, functions and/or operations of the method 400 may be performed by a device as illustrated in FIG. 1, e.g., AS 104 or any one or more components thereof. In one example, the steps, functions, or operations of method 400 may be performed by a computing device or system 700, and/or a processing system 702 as described in connection with FIG. 7 below. For instance, the computing device 700 may represent at least a portion of the AS 104 in accordance with the present disclosure. For illustrative purposes, the method 400 is described in greater detail below in connection with an example performed by a processing system, such as processing system 702. Generally, the method 400 may extract information that can help to determine whether the behavior of a person depicted in a test media clip is typical or atypical for that person (where typical behavior may be an indicator of authenticity and atypical behavior may be an indicator of inauthenticity). The method 400 thus recognizes that what may constitute unusual or atypical behavior for the average person may not be unusual or atypical for a specific person.

The method 400 begins in step 402 and proceeds to step 404. In step 404, the processing system may acquire an historical media clip of a person depicted in a test media clip whose authenticity is being evaluated (e.g., according to the method 200). As discussed above, the person may be a well-known person, such as a politician, an actor, a professional athlete, or the like. Well-known people are the most likely people to be the subjects of synthetic media. In one example, the identity of the person may be determined using facial recognition techniques to analyze the video of the test media clip and the video of the historical media clip. In another example, the identity of the person may be determined using voice recognition techniques to analyze the audio of the test media clip and the audio of the historical media clip. In a further example, image and/or audio analysis techniques could be used to detect the person's name in the test media clip and the historical media clip (e.g., the person's name may appear in a closed captioning track or may be spoken by another person). In another example, the person's identity may be indicated in metadata associated with the test media clip and/or the historical media clip.

In step 406, the processing system may identify a message expressed by the person in the historical media clip (similar to step 304 of the method 300). For instance, if the person is a politician, the processing system may analyze the historical media clip using speech recognition analysis, sentiment analysis, and other audio processing techniques in order to identify the person's position with respect to a particular political issue. The processing system might also use image analysis and/or text recognition techniques in order to analyze text and imagery appearing in the historical media clip, such as the text or imagery of a campaign poster or banner.

In step 408, the processing system may determine at least one context for the historical media clip. In one example, the context may comprise at least one of: a time of day depicted in the historical media clip (e.g., morning, afternoon, evening, etc.), a location depicted in the historical media clip (e.g., a political rally, a press conference, a restaurant, a home, etc.), and/or an event that occurred in proximity to the historical media clip (e.g., right before an election, right after a natural disaster, etc.).

In step 410, the processing system may identify at least one outlier in the historical media clip, where the outliers may be defined as discussed above. For instance, the outlier may be a behavior that is considered atypical for the general population (e.g., swearing excessively, making false claims, encouraging illegal or immoral behavior, etc.).

In step 412, the processing system may identify any public feedback associated with the historical media clip. In one example, the feedback may be directly associated with the historical media clip. For instance, if the historical media clip is published on a social media platform, users of the social media platform may leave feedback in the form of "likes," "dislikes," comments, or other forms. In another example, the feedback may be indirectly associated with the historical media clip via one or more secondary sources (where the historical media clip is considered the primary source), such as newspaper articles, blog postings, news segments, or the like commenting on the historical media clip or any rebuttal material to such commentary that may be provided by the person depicted in the historical media clip.

In step 414, the processing system may calculate a confidence score (e.g., a second score) for the historical media clip, where the confidence score indicates a likelihood that the historical media clip is authentic (e.g., not synthetic). In one example, the confidence score may be calculated as:

$$\frac{S1 + S2 + S3 + S4}{4} \quad \text{(EQN. 2)}$$

Where S1-S4 are scores that are calculated based on characteristics of the historical media segment and subsequently aggregated. The scores S1-S4 may be calculated using machine learning techniques that learn the relative values of various characteristics of media clips, as discussed in further detail below. In one example, the maximum value for the confidence score may be one hundred, where one hundred indicates a highest degree of confidence (likelihood of authenticity).

The score S1, for instance, may be calculated based on the age of the historical media segment. In one example, the score S1 is inversely proportional to the age of the historical media segment (i.e., the older the historical media segment is, the lower the score S1 is). This accounts for the possibility that opinions and circumstances may evolve over time (e.g., a politician who previously did not support a particular issue may gradually come to support the issue). For instance, a score of one hundred may be assigned to an historical media clip that is less than one day old, a score of ninety may be assigned to an historical media clip that is between one day and seven days old, a score of eighty may be assigned to an historical media clip that is between seven days and twenty-eight days old, etc. The score S1 may phase out, such that once the age of the historical media clip reaches a maximum age (e.g., one year), the score S1 may fall to zero. In one example, the speed with which the score S1 phases out to zero may depend on how frequently the person depicted in the historical media clip appears in published media clips. For instance, for a person who publishes media clips of themselves on a daily or near-daily basis, the score S1 may phase out to zero more quickly than for a person who appears in media clips only a few times a year.

The score S2, for instance, may be calculated based on whether the person depicted in the historical media clip confirmed or denied the authenticity of the historical media clip. For instance, if the person depicted in the historical media clip denied the authenticity of the historical media clip, then the score S2 may be zero; if the person depicted in the historical media clip confirmed the authenticity of the historical media clip, then the score S2 may be one hundred; if the person depicted in the historical media clip has neither confirmed nor denied the authenticity of the historical media clip, then the score S2 may be fifty (or some other value between zero and one hundred).

The score S3, for instance, may be calculated based on the degree of public engagement with the historical media clip. In one example, the score S3 is proportional to the degree of public engagement (e.g., "likes," "dislikes," comments, and the like as discussed above) with the historical media clip. For example, a score S3 of one hundred may be assigned to an historical media clip that has at least one hundred thousand likes and at least five likes for every dislike, a score S3 of ninety may be assigned to an historical media clip that has between ninety thousand and one hundred thousand likes and at least five likes for every dislike, etc. The score S3 may phase out, such that once the level of engagement (e.g., number of likes) of the historical media clip falls below a minimum number (e.g., one thousand), the score S3 may fall to zero. In one example, the speed with which the score S3 phases out to zero may depend on a ratio of likes to dislikes (e.g., if dislikes far outnumber likes, then the score may be lower even though the number of likes is very high). In another example, text recognition and/or sentiment analysis techniques may also be used to extract sentiment from any comments associated with the historical media clip. For instance, a comment may support or denounce the message of the historical media clip, may express surprise in response to the message of the historical media clip (e.g., potentially indicating that the message is atypical for the person depicted in the historical media clip), and the like.

The score S4, for instance, may be calculated based on the existence of any external actions or events that occurred as a result of the historical media clip. For instance, in response to an historical media clip in which a well-known financial advisor recommended investing in a particular company, that company's stock price may rise to a record high. In response to an historical media clip in which a politician advocated for a change in a particular policy, the policy change may have been enacted. In one example, each external action or event that occurred as a result of the historical media clip may result in a certain number of points being added to the score S4 (e.g., with a maximum of 100 points being possible). For instance, one to two external events or actions may result in twenty-five points being added to the score S4, three to four external events or actions may result in fifty points being added to the score S4, and so on.

In one example of step 414, where the historical media clip comprises footage of a live event (e.g., as opposed to a media clip that may have been scripted and edited), the historical media clip may be assigned a confidence score of one hundred (or within a few points, such as five to ten points, of one hundred), without having to compute the confidence score according to EQN. 2. For instance, footage of a live event, especially an event that can be correlated with or verified by multiple third-person video recordings by unrelated parties (e.g., different videos of the same live event which have been uploaded to social media by different users who were present at the live event), may be considered highly likely to be authentic.

In step 416, the processing system may store the confidence score and at least one of the message, the context, the outlier, and the feedback. In one example, the confidence score and the message, the context, the outlier, and/or the feedback may be stored in a profile for the person depicted in the historical media clip. In another example, the confidence score and the message, the context, the outlier, and/or the feedback may be stored as metadata associated with the historical media clip. Thus, the confidence score may be used to determine a likelihood that a given media clip is authentic when the given media clip exhibits a similar message, context, outliers, and/or engagement to the historical media clip. The method 400 may end in step 418.

The method 400 may be performed for a plurality of historical media clips. For instance, a plurality of historical media clips may be acquired in step 404, and the subsequent steps of the method 400 may be performed for each historical media clip individually to generate a confidence score for each of the historical media clips. In one example, the plurality of historical media clips may be ranked according to their confidence scores from highest to lowest score and then compared in that order (i.e., from highest score to lowest score) against a test media clip as discussed in connection with the method 200.

Figure 5:
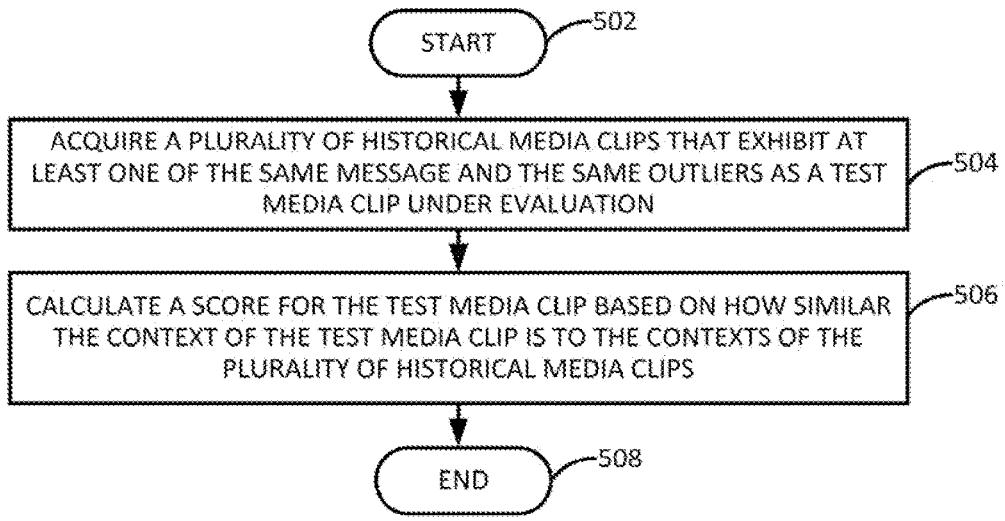
FIG. 5 illustrates a flowchart of an example method for calculating a confidence score for a test media clip, in accordance with the present disclosure.

FIG. 5 illustrates a flowchart of an example method 500 for calculating a confidence score for a test media clip, in accordance with the present disclosure. For instance, the method 500 may be implemented in conjunction with step 204 of the method 200, described above, as one of the plurality of authenticity algorithms. As such, in one example, steps, functions and/or operations of the method 500 may be performed by a device as illustrated in FIG. 1, e.g., AS 104 or any one or more components thereof. In one example, the steps, functions, or operations of method 500 may be performed by a computing device or system 700, and/or a processing system 702 as described in connection with FIG. 7 below. For instance, the computing device 700 may represent at least a portion of the AS 104 in accordance with the present disclosure. For illustrative purposes, the method 500 is described in greater detail below in connection with an example performed by a processing system, such as processing system 702. Generally, the method 500 may estimate the authenticity of a test media clip based on similarities to historical media clips excluding media clips that depict the person depicted in the test media clip. In other words, the method 500 evaluates the message and outliers of a test media clip against the messages and outliers of historical media clips that share similarities in context (e.g., circumstances, location, and timing), but not necessarily in the people depicted. Thus, the method 500 seeks to determine what types of behaviors are considered typical for people in general (as opposed to for a specific person), given a certain context (e.g., set of circumstances, timing, and location).

The method 500 begins in step 502 and proceeds to step 504. In step 504, the processing system may acquire a plurality of historical media clips that exhibit at least one of the same message and the same outliers as a test media clip under evaluation. The plurality of historical media clips may depict people other than the person who is depicted in the test media clip, however. For instance, the test media clip may depict a candidate for political office making unrealistic promises. Thus, the processing system may acquire a plurality of historical media clips of other politicians making unrealistic promises.

In step 506, the processing system may calculate a score (e.g., a third score) for the test media clip based on how similar the context (e.g., circumstances, location, and timing) of the test media clip is to the contexts of the plurality of historical media clips. For instance, referring again to the example test media clip of the political candidate making unrealistic promises, the test media clip may purport to have been filmed at a campaign rally one month before an election. If the historical media clips of other politicians making unrealistic promises also occurred shortly before elections, this may indicate that making unrealistic promises before an election is not an atypical behavior for politicians in general. Similarly, if the test media clip depicted a celebrity swearing at a server in a restaurant at 3:00 PM, the plurality of historical media clips may comprise videos of other people who were present in the same restaurant at the same time. If other people in the restaurant are also depicted as being upset with the server (e.g., perhaps the server was behaving rudely to all customers in the same restaurant), this may indicate that the test media clip is likely to be authentic.

In one example, the score may be calculated as the number of historical media clips that match the test clip based on context, divided by the total number of historical media clips that were compared to the test media clip. The method may end in step 508.

Figure 6:
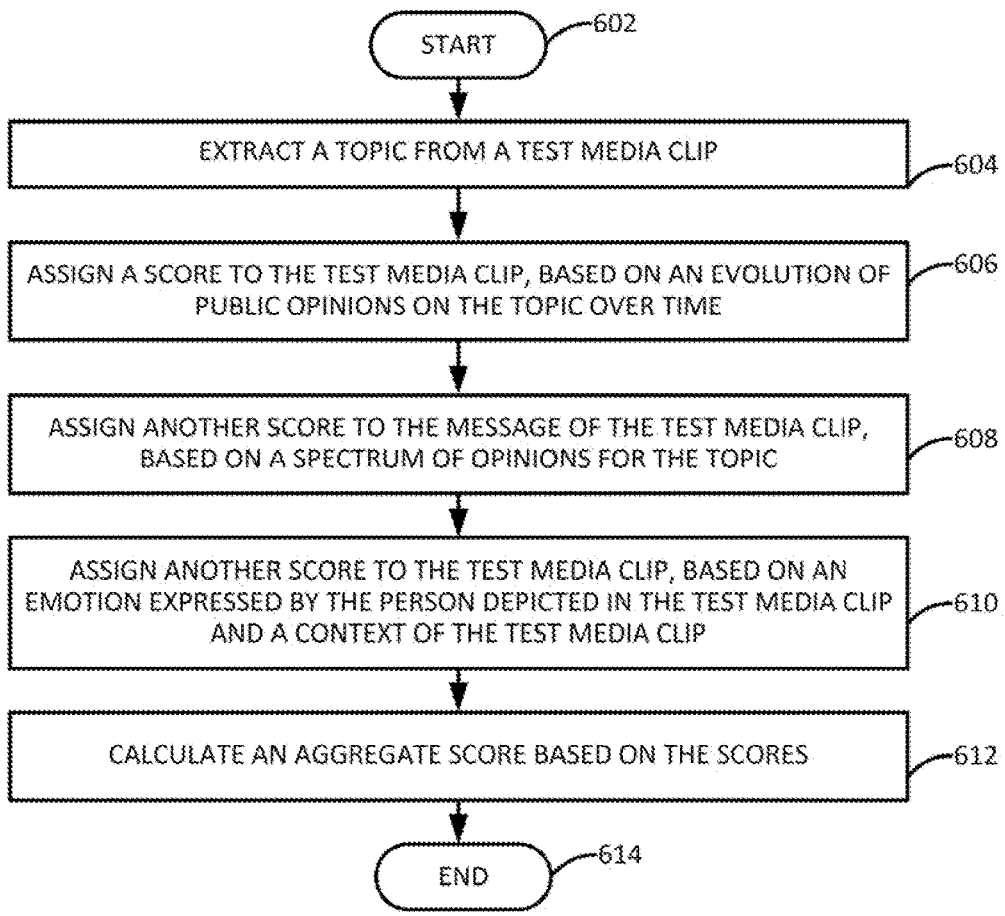
FIG. 6 illustrates a flowchart of an example method for calculating a confidence score for a test media clip, in accordance with the present disclosure.

FIG. 6 illustrates a flowchart of an example method 600 for calculating a confidence score for a test media clip, in accordance with the present disclosure. For instance, the method 600 may be implemented in conjunction with step 204 of the method 200, described above, as one of the plurality of authenticity algorithms. As such, in one example, steps, functions and/or operations of the method 600 may be performed by a device as illustrated in FIG. 1, e.g., AS 104 or any one or more components thereof. In one example, the steps, functions, or operations of method 600 may be performed by a computing device or system 700, and/or a processing system 702 as described in connection with FIG. 7 below. For instance, the computing device 700 may represent at least a portion of the AS 104 in accordance with the present disclosure. For illustrative purposes, the method 600 is described in greater detail below in connection with an example performed by a processing system, such as processing system 702. Generally, the method 600 may estimate the authenticity of a test media clip based on evolving attitudes with respect to a particular topic over time and over changing circumstances.

The method 600 begins in step 602 and proceeds to step 604. In step 604, the processing system may extract a topic from a test media clip. As discussed above, the test media clip may comprise a media clip, depicting a specific person (e.g., a well-known person), whose authenticity is being evaluated. The topic may comprise a subject that the test media clip focuses on. The topic may be different from the message of the test media clip, which is discussed above. For instance, the message may express a specific opinion related to the topic, while the topic may be neutral. As an example, a topic of a test media clip might comprise "healthcare," while a message of the test media clip may comprise the belief that healthcare should be provided with government assistance. In one example, the topic may be extracted from the test media clip using speech recognition techniques, keyword detection techniques, and/or sentiment analysis techniques. For instance, if the person depicted in the test media clip talks about "universal health coverage" or the "costs of healthcare," this may indicate that "healthcare" is a topic of the test media clip.

In step 606, the processing system may assign a score (e.g., score S5) to the test media clip, based on an evolution of public opinions on the topic over time (which may be identified based on a plurality of historical media clips and/or on external data sources such as news articles, web sites, and the like). For instance, referring again to the example topic of "healthcare," the processing system may determine that although there was little support for government-funded healthcare twenty years ago, a much larger percentage of the population currently supports some aspects of government-funded healthcare. In one example the processing system may assign the score S5 to the test media clip, based on how closely the message of the test media clip aligns with current public opinion on the topic. For instance, a range of scores may be possible (e.g., zero to one hundred), where the lowest score in the range is associated with the oldest observed instance of opinion on the topic and the highest score in the range is associated with the most recently observed instance of opinion on the topic. Opinions observed in the intervening times may be assigned scores that fall somewhere between the lowest score and the highest score. The score S5 for the test media clip may then be assigned based on the score assigned to the opinion that most closely matches the message.

In step 608, the processing system may assign another score (e.g., score S6) to the message of the test media clip, based on a spectrum of opinions for the topic. For instance, referring again to the example topic of "healthcare," the processing system may determine, based on a review of a plurality of historical media clips and/or on external data sources (e.g., news articles, web sites, etc.), that current opinions on the example topic of "healthcare" range from the extremes of support for no government involvement in healthcare funding to support for healthcare that is fully government funded. The extrema may be associated with scores (e.g., one for the first extrema and ten for the second extrema), and the processing system may assign the score S6 to the message of the test clip that falls somewhere between the scores of the two extrema based on a distance of the message to the extrema (e.g., a message expressing support for partially government-funded healthcare might be assigned a score S6 of five in this example).

In step 610, the processing system may assign another score (e.g., score S7) to the test media clip, based on an emotion expressed by the person depicted in the test media clip and a context of the test media clip. For instance, a person may be expected to express happiness during a celebration, anxiety while waiting for election results, combativeness during an interrogation, etc. Emotions may be divided into at least two categories, such as positive and negative. Within these categories, emotions may be further divided. For instance, positive emotions may include trust, joy, surprise, and the like, while negative emotions may include fear, sadness, anger, disgust, and the like. Each of the emotions within a category may be assigned a score on a scale (e.g., one to ten, where the score may increase with the intensity of the emotion). In one example, a clustering technique may be applied to a plurality of historical media clips to determine expected behaviors for specific circumstances and time periods. The score of the emotion that most closely matches the emotion expressed by the person depicted in the test media clip may be assigned to the test media clip as the score S7.

In step 612, the processing system may calculate an aggregate score (e.g., a fourth score) based on the scores S5-S7. For instance, the aggregate scores may be calculated as:

$$\frac{S_5 + S_6 + S_7}{3} \qquad \text{(EQN. 3)}$$

The method 600 may end in step 614.

It should be noted that the methods 200-600 may be expanded to include additional steps or may be modified to include additional operations, parameters, or scores with respect to the steps outlined above. In addition, although not specifically specified, one or more steps, functions, or operations of the methods 200-600 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2, 3, 4, 5, or 6 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 7 depicts a high-level block diagram of a computing device or processing system specifically programmed to perform the functions described herein. As depicted in FIG. 7, the processing system 700 comprises one or more hardware processor elements 702 (e.g., a central processing unit (CPU), a microprocessor, or a multi-core processor), a memory 704 (e.g., random access memory (RAM) and/or read only memory (ROM)), a module 705 for estimating the authenticity of a media clip, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200, 300, 400, 500, or 600 as discussed above is implemented in a distributed or parallel manner for a particular illustrative example, i.e., the steps of the above method 200, 300, 400, 500, or 600 or the entire method 200, 300, 400, 500, or 600 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 702 can also be configured or programmed to cause other devices to perform one or more operations as discussed above. In other words, the hardware processor 702 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200, 300, 400, 5Z00, or 600. In one example, instructions and data for the present module or process 705 for estimating the authenticity of a media clip (e.g., a software program comprising computer-executable instructions) can be loaded into memory 704 and executed by hardware processor element 702 to implement the steps, functions, or operations as discussed above in connection with the illustrative method 200, 300, 400, 500, or 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 705 for estimating the authenticity of a media clip (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
calculating, by a processing system including at least one processor, a plurality of scores for a test media clip using a plurality of authenticity algorithms, where the test media clip depicts a person, and wherein each authenticity algorithm of the plurality of authenticity algorithms generates a respective score of the plurality of scores which indicates a likelihood that the test media clip is authentic;
testing, by the processing system, each authenticity algorithm of the plurality of authenticity algorithms against a plurality of historical media clips, in order to determine, for the each authenticity algorithm, a reliability of the each authenticity algorithm in terms of being able to estimate authenticity;
deriving, by the processing system, a plurality of weights based on the testing, wherein each weight of the plurality of weights is associated with one authenticity algorithm of the plurality of authenticity algorithms;
computing, by the processing system, a cumulative authenticity score for the test media clip, by aggregating the plurality of scores weighted by the plurality of weights;
generating, by the processing system, a metadata tag with the cumulative authenticity score for the test media clip; and
annotating, by the processing system, the test media clip with the metadata tag.

2. The method of claim 1, wherein one authenticity algorithm of the plurality of authenticity algorithms identifies a message of the test media clip.

3. The method of claim 2, wherein the one authenticity algorithm compares a correlation between the message and a video component of the test media clip to a correlation between a message and a video component of at least one historical media clip of the plurality of historical media clips.

4. The method of claim 3, wherein the one authenticity algorithm of the plurality of authenticity algorithms further detects at least one outlier in the test media clip, where the at least one outlier comprises a statement or an action that is considered atypical for a general population.

5. The method of claim 4, wherein the at least one outlier is detected by comparing the statement or the action to at least one third party online resource that contradicts the statement or the action.

6. The method of claim 4, wherein the at least one outlier is detected by comparing the statement or the action to a list of predefined statements and actions that are designated as outliers.

7. The method of claim 4, wherein a score of the plurality of scores is calculated based on the correlation between the message and the video component of the test media clip and the at least one outlier.

8. The method of claim 1, wherein one authenticity algorithm of the plurality of authenticity algorithms compares a behavior of the person depicted in the test media clip to a behavior of the person in at least one historical media clip of the plurality of historical media clips.

9. The method of claim 1, wherein one authenticity algorithm of the plurality of authenticity algorithms compares a context of the test media clip with a context of at least one historical media clip of the plurality of historical media clips.

10. The method of claim 9, where the at least one historical media clip depicts a person other than the person depicted in the test media clip.

11. The method of claim 10, wherein the at least one historical media clip shares at least one of: a message or an outlier with the test media clip.

12. The method of claim 1, wherein one authenticity algorithm of the plurality of authenticity algorithms statistically compares an attitude expressed by the person depicted in the test media clip to an attitude expressed by the person in a plurality of historical media clips covering a period of time.

13. The method of claim 12, wherein the one authenticity algorithm further determines a topic to which the attitude pertains.

14. The method of claim 13, wherein the one authenticity algorithm traces an evolution of a public opinion on the topic over the period of time.

15. The method of claim 14, wherein a first score is assigned to a first extrema of the public opinion, a second score is assigned to a second extrema of the public opinion, and a third score falling between the first score and the second score is assigned to the test media clip based on a distance of the attitude to the first extrema and the second extrema.

16. The method of claim 1, wherein the person is a public figure.

17. The method of claim 1, wherein one authenticity algorithm of the plurality if algorithms assigns a confidence of one hundred to the test media clip when the test media clip is determined to comprise video of a live event.

18. A non-transitory computer-readable medium storing instructions which, when executed by a processing system including at least one processor, cause the processing system to perform operations, the operations comprising:

calculating a plurality of scores for a test media clip using a plurality of authenticity algorithms, where the test media clip depicts a person, and wherein each authenticity algorithm of the plurality of authenticity algorithms generates a respective score of the plurality of scores which indicates a likelihood that the test media clip is authentic;

testing each authenticity algorithm of the plurality of authenticity algorithms against a plurality of historical media clips, in order to determine, for the each authenticity algorithm, a reliability of the each authenticity algorithm in terms of being able to estimate authenticity;

deriving a plurality of weights based on the testing, wherein each weight of the plurality of weights is associated with one authenticity algorithm of the plurality of authenticity algorithms;

computing a cumulative authenticity score for the test media clip, by aggregating the plurality of scores weighted by the plurality of weights;

generating a metadata tag with the cumulative authenticity score for the test media clip; and annotating the test media clip with the metadata tag.

19. A device comprising:

a processing system including at least one processor; and a non-transitory computer-readable medium storing instructions which, when executed by the processing system, cause the processing system to perform operations, the operations comprising:

calculating a plurality of scores for a test media clip using a plurality of authenticity algorithms, where the test media clip depicts a person, and wherein each authenticity algorithm of the plurality of authenticity algorithms generates a respective score of the plurality of scores which indicates a likelihood that the test media clip is authentic;

testing each authenticity algorithm of the plurality of authenticity algorithms against a plurality of historical media clips, in order to determine, for the each authenticity algorithm, a reliability of the each authenticity algorithm in terms of being able to estimate authenticity;

deriving a plurality of weights based on the testing, wherein each weight of the plurality of weights is associated with one authenticity algorithm of the plurality of authenticity algorithms;

computing a cumulative authenticity score for the test media clip, by aggregating the plurality of scores weighted by the plurality of weights;

generating a metadata tag with the cumulative authenticity score for the test media clip; and annotating the test media clip with the metadata tag.

20. The device of claim 19, wherein one authenticity algorithm of the plurality of authenticity algorithms identifies a message of the test media clip.

* * * * *